United States Patent Office.

WILLIAM FIELDS, OF WILMINGTON, DELAWARE.

*Letters Patent No.* 102,796, *dated May* 10, 1870; *reissue No.* 4,069, *dated July* 12, 1870.

IMPROVEMENT IN THE MANUFACTURE OF STEEL.

The Schedule referred to in these Letters Patent and making part of the same

I, WILLIAM FIELDS, of the city of Wilmington, in the State of Delaware, have invented an Improved Process in the Manufacture of Steel, of which the following is a specification.

*Nature and Object of the Invention.*

The nature of the invention consists in the combinations or chemical compounds hereinafter fully described, one of which is thrown into the boiling or puddling-furnace while the iron is in a thoroughly molten condition, with the damper nearly closed, and, when these chemicals have been thoroughly incorporated with the iron, thereby decarbonizing, desulphurizing, and dephosphorizing it the damper is then raised for a few moments, to allow the escape of the disengaged sulphur, phosphorus, and carbon; then lowered, as before, and another compound, hereinafter described, cast into the furnace, and quickly stirred into the molten mass of cinder and iron, and the damper kept in the same position until sufficient time has elapsed to recarbonize and alloy the iron to constitute it steel of the desired quality.

*General Description.*

I charge a puddling-furnace with from three hundred pounds to seven hundred pounds of one or more kinds of pig-iron, according to the size of the furnace, in the usual manner. To this I add from five to twenty per cent. additional of Franklinite iron, or, in lieu thereof, of a similar proportion of *spiegeleisen*, manganiferous iron, or magnetic iron sands of Canada, according to the quality of the steel to be made.

The Franklinite iron, or its equivalent in *spiegeleisen*, manganiferous iron, or magnetic iron sands of Canada, may be charged at the same time with the other iron, or subsequently, provided they are perfectly melted together by the time the stirring of the iron is commenced. The damper is then almost closed, and a thoroughly mixed chemical compound, in the form of a package, is cast into the furnace, and rapidly stirred into the molten mass. This chemical compound is composed of the following ingredients in the following proportions, to wit: to every four hundred and fifty pounds of pig-iron, one pound of sal soda, (English sal soda preferred,) ten ounces of sal ammoniac, and one ounce of magnesia. The damper is then raised to free the furnace from the disengaged sulphur and carbon, the result being an iron homogeneous, neutral, and malleable, or, in other words, dephosphorized, desulphurized, and decarbonized. As soon as this is effected the damper is again almost closed, and another chemical compound cast into the furnace, composed of the following ingredients, in the proportions as follows: to every four hundred and fifty pounds of pig-iron, one pound of black oxide of manganese, two pounds of chromate of iron, or metallic chromium, eight ounces of wolfram, one-quarter ounce of silver, dram of platinum, one-quarter ounce of paladium, one-quarter ounce of iridium, one-quarter ounce of osmium, and one quarter ounce of rhodium.

This compound is stirred quickly into the still molten mass of cinder and iron, and when this has been done I throw into the furnace one-half peck of pulverized charcoal or carbon, and this is worked, with the damper almost closed, thoroughly into the iron, and until it is balled up for removal from the furnace. It is then removed from the furnace as quickly as possible, to prevent the escape of the carbon by oxidation of the steel; or, the process being carried to the point where the carbon or charcoal is worked into the iron, as before described, and, before it has lost its fluidity, I run it off through a tap-hole, constructed in the furnace for the purpose, into suitable flasks for forming them into ingots for rolling or hammering.

The steel made by this process possesses great tensile strength, may be forged at the highest welding heat without injury, welds perfectly to itself or iron without borax or other flux, hardens and tempers like cast steel, and is as well suited, without fusing or refining, for most purposes as refined steel is.

I do not confine myself to the quantity of charcoal or carbon used, nor to the exact proportions of the several chemicals mentioned in the foregoing compounds, nor to the use of the whole of them, for this reason, that it depends upon the quality of the iron used as to whether the proportions of these ingredients should be greater or smaller than before stated, or whether it is necessary to use all of them to obtain the best result. This must depend upon the judgment of the operator, who is supposed to know the quality of iron he uses. For instance, when the iron is very poor and difficult to fuse, I should use the Franklinite iron or *spiegeleisen* iron in the proportion of from fifteen to twenty per cent., at least double the quantity of sal ammoniac, and double the quantity of magnesia, at least one-third more chromate of iron or metallic chromium.

Where the iron used is very good, and comparatively free from sulphur and phosphorus, and readily fusible, the proportions first hereinbefore named are sufficient, and also where the iron is very good, as aforesaid, any one, or all, of the following ingredients may be omitted: silver, platinum, palladium, rhodium, iridium, and osmium, as their use, though desirable, is not absolutely essential; also, where I desire to produce a high grade of steel, I would use at least the above-named quantity of pulverized charcoal or carbon, for a low grade not more than a quarter of a peck.

I do not claim broadly the use of chromate of iron and wolfram in the compound for making steel from cast iron, nor do I claim the use of Franklinite iron and *spiegeleisen* iron, as I am aware that they have been used in the treatment of iron; but

What I claim as my invention is—

1. The employment of magnesia in the quantity specified, when used as and for the purposes described.

2. The process of treating iron during the puddling or boiling process for the purpose of converting it into steel, with a chemical compound composed of the ingredients hereinbefore first named, in the quantities specified, and prepared and used in the manner and form described, substantially as and for the purposes set forth, being the compound first used in the process.

3. The employment of silver in the quantity specified, substantially as and for the purposes hereinbefore set forth.

4. The employment of platinum in the quantity specified, substantially as and for the purposes hereinbefore mentioned.

5. The employment of rhodium in the quantity specified, substantially as and for the purposes hereinbefore described.

6. The employment of wolfram in the quantity described, substantially as and for the purposes set forth.

7. The employment of iridium, the quantity specified, substantially as and for the purposes hereinbefore mentioned.

8. The employment of osmium in the quantity specified, substantially as and for the purposes hereinbefore mentioned.

9. The employment of palladium in the quantity specified, substantially as and for the purposes described.

10. The employment of pulverized charcoal or carbon in the quantity specified, at the time of the above process mentioned, substantially as and for the purposes set forth, to wit: to recarbonize the iron, thereby converting it into steel.

11. The process of treating iron for the purpose of converting it into steel, during the puddling process, with a chemical compound, composed of the ingredients hereinbefore last mentioned, in the quantities specified and prepared in the manner and form hereinbefore described, it being the compound used in the latter part of the process, together with the use of the carbon or pulverized charcoal, substantially as and for the purposes hereinbefore described.

12. The whole process of treating iron for the purposes aforesaid, as hereinbefore fully set forth and described, substantially as and for the purposes mentioned.

WILLIAM FIELDS.

Witnesses:

LEVI C. BOOTES,

JAMES MOORE.